US012786283B2

(12) United States Patent
Xiong et al.

(10) Patent No.: US 12,786,283 B2
(45) Date of Patent: Nov. 3, 2026

(54) INTELLIGENT PROACTIVE CONTENT SERVICE DELIVERY

(71) Applicant: Microsoft Technology Licensing, LLC, Redmond, WA (US)

(72) Inventors: Pengcheng Xiong, San Jose, CA (US); Zhong Wu, Kirkland, WA (US); Min Zhang, Sammamish, WA (US); Sagar Manchanda, Seattle, WA (US); Zhenquan Li, Suzhou (CN); Zhangning Hu, Beijing (CN); Yongzhi Li, Beijing (CN); Christopher Paul Phelps, Seattle (CN); Xiao Wang, Redmond, WA (US); Dan Wu, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 714 days.

(21) Appl. No.: 18/335,338

(22) Filed: Jun. 15, 2023

(65) Prior Publication Data

US 2024/0422238 A1 Dec. 19, 2024

(51) Int. Cl.

*H04L 67/55* (2022.01)
*G06N 7/02* (2006.01)
*H04L 67/50* (2022.01)

(52) U.S. Cl.

CPC ............... *H04L 67/55* (2022.05); *G06N 7/02* (2013.01); *H04L 67/535* (2022.05)

(58) Field of Classification Search

CPC ..... H04L 67/535; H04L 67/55; H04L 67/306; G06N 7/02; G06N 20/00; G06N 5/048; G06N 5/025

(Continued)

(56) References Cited

U.S. PATENT DOCUMENTS

| | | | | |
|---|---|---|---|---|
| 11,049,133 B1 * | 6/2021 | Huang | ............... | G06Q 30/0249 |
| 2002/0161767 A1 * | 10/2002 | Shapiro | ................. | G06F 16/958 707/999.009 |

(Continued)

OTHER PUBLICATIONS

Li et al., "Predictive Edge Caching through Deep Mining of Sequential Patterns in User Content Retrievals", ARXIV ID: 2210.02657, Oct. 6, 2022, pp. 1-14. (Year: 2022).*

*Primary Examiner* — Hwei-Min Lu

(74) *Attorney, Agent, or Firm* — Shook, Hardy & Bacon L.L.P.

(57) ABSTRACT

Aspects of the disclosure include methods and systems for proactive content service delivery. An exemplary method can include determining a delivery interval for a content update by defining delivery interval dimensions, each of a unique combination of time and user cohorts, determining a time cohort and a user cohort for the user, and selecting a predetermined delivery interval of the delivery interval dimension matching the time cohort and the user cohort of the user as the delivery interval. The method further includes determining a delivery content by training a classification model to predict whether content will result in an impression, inputting, into the classification model, the content update, receiving an impression score for the content update, and selecting one of a full update and a partial update as the delivery content from the impression score. The content update can be pushed to a client device according to the delivery interval.

20 Claims, 6 Drawing Sheets

(58) Field of Classification Search
USPC ............ 706/58, 52, 8, 12; 709/224; 707/628
See application file for complete search history.

(56) References Cited

U.S. PATENT DOCUMENTS

| | | | | |
|---|---|---|---|---|
| 2008/0113656 | A1* | 5/2008 | Lee | H04L 67/62 455/414.3 |
| 2009/0271778 | A1* | 10/2009 | Mandyam | G06F 16/00 707/999.1 |
| 2014/0136951 | A1* | 5/2014 | Kumar | G06F 16/9574 715/234 |
| 2016/0103921 | A1* | 4/2016 | Brust | G06F 16/9535 707/722 |
| 2016/0210321 | A1* | 7/2016 | Gong | G06F 16/23 |
| 2017/0026331 | A1* | 1/2017 | Vijay | G06Q 10/107 |
| 2018/0139295 | A1* | 5/2018 | Ju | G06F 11/34 |
| 2019/0109926 | A1* | 4/2019 | Hotchkies | H04L 67/568 |
| 2019/0334733 | A1* | 10/2019 | Jaiswal | H04L 67/54 |
| 2021/0233113 | A1* | 7/2021 | Ren | G06Q 30/0264 |
| 2022/0351070 | A1* | 11/2022 | Liu | G06N 20/00 |
| 2022/0377424 | A1* | 11/2022 | Deng | G06Q 30/0282 |
| 2023/0048437 | A1* | 2/2023 | Karbasi | G06F 9/453 |

* cited by examiner

INTELLIGENT PROACTIVE CONTENT SERVICE DELIVERY

INTRODUCTION

The subject disclosure relates to content delivery, and particularly to intelligent and proactive content service delivery.

Content service delivery refers to the process of providing and distributing various types of content to users, often across different platforms and devices. Content service delivery generally involves the transfer and routing of digital content, such as text, images, videos, audio, and software updates, from a content provider's server to a collection of end user devices. The digital content can include, for example, news articles, national and local weather updates and reports, trending stories, market and financial updates, and a variety of user and system level notifications.

A content delivery service often acts as an intermediary between the content providers and the end users, ensuring efficient, fast, and secure delivery of the digital content between different devices and across various networks. Content delivery services can employ various techniques to enhance delivery performance. For example, incorporating content compression, protocol optimization, adaptive bitrate streaming, and using technologies like content preloading can ensure a smooth and uninterrupted user experience. By leveraging these and other techniques, such as caching, replication, intelligent routing, and performance optimization, content delivery services can enhance the user experience and can enable content providers to reach a wider audience effectively.

Content service delivery can be responsive, proactive, or use a combination of responsive and proactive content delivery techniques. A responsive content service delivery is driven by user interactions and requests. For example, sports-related content can be delivered to a user in response to specific user actions, such as making search queries for game score updates, clicking a sports widget, or otherwise explicitly requesting the content. In contrast, proactive content service delivery refers to the process of delivering content to end users without requiring explicit user interactions or requests. In this approach, the content is pushed to users proactively based on predefined criteria, such as user preferences, demographics, or a predetermined schedule. For example, a uniform content update can be pushed to all end user devices every 35 minutes.

SUMMARY

Embodiments of the present invention are directed to methods for providing proactive content service delivery. A non-limiting example method includes determining a delivery interval for a content update by defining delivery interval dimensions, each of a unique combination of time and user cohorts, determining a time cohort and a user cohort for the user, and selecting a predetermined delivery interval of the delivery interval dimension matching the time cohort and the user cohort of the user as the delivery interval. The method further includes determining a delivery content by training a classification model to predict whether content will result in an impression, inputting, into the classification model, the content update, receiving an impression score for the content update, and selecting one of a full update and a partial update as the delivery content from the impression score. The content update can be pushed to a client device according to the delivery interval.

Embodiments of the present invention are directed to systems for providing proactive content service delivery. A non-limiting example system includes a memory having computer readable instructions and one or more processors for executing the computer readable instructions. The computer readable instructions control the one or more processors to perform various operations. The operations include receiving, from a proactive content delivery system, a delivery interval for content updates; requesting to participate in content updates from the proactive content delivery system according to the delivery interval; receiving, from the proactive content delivery system, a content update comprising one of a full update and a partial update at a frequency defined by the delivery interval; locally caching the content update; and rendering a preview frame from the cached content update.

Another non-limiting example system includes a proactive content delivery system including a memory having computer readable instructions, and one or more processors for executing the computer readable instructions. The computer readable instructions control the one or more processors to perform operations. The operations include determining a delivery interval for a content update provided to a user. Determining the delivery interval includes defining a plurality of delivery interval dimensions, each delivery interval dimension comprising a unique combination of one time cohort of two or more time cohorts and one user cohort of two or more user cohorts; determining a time cohort and a user cohort for the user; and selecting a predetermined delivery interval of the delivery interval dimension matching the time cohort and the user cohort of the user as the delivery interval. The operations further include determining a delivery content for the content update provided to the user. Determining the delivery content includes training a classification model to predict whether content will result in an impression; inputting, into the classification model, the content update; receiving, as output from the classification model, an impression score for the content update; and selecting one of a full update and a partial update as the delivery content from the impression score. The operations further include pushing the content update comprising the delivery content to a client device of the user at a frequency defined by the delivery interval.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

Content service delivery can be responsive (also referred to as reactive), proactive (also referred to as passive), or use a combination of responsive and proactive content delivery techniques. Proactive content delivery offers some advantages over reactive platforms, as the consistent, passive updates provide, in effect, content preloading. In particular, proactively pushed content can be stored or cached locally for rapid access. From an end user perspective, the proactively delivered content, pre-cached locally, appears instantly available without loading or latency delays. The result is a smooth, uninterrupted user experience. On the other hand, proactive content delivery requires some tradeoffs. Notably, proactive content delivery requires pushing a large amount of data to a large number of client devices at regular intervals.

Figure 1A:
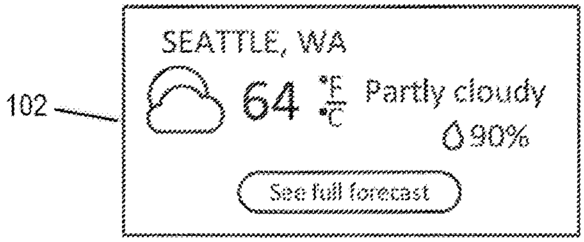
FIG. 1A depicts an example preview frame in accordance with one or more embodiments.
Figure 1B:
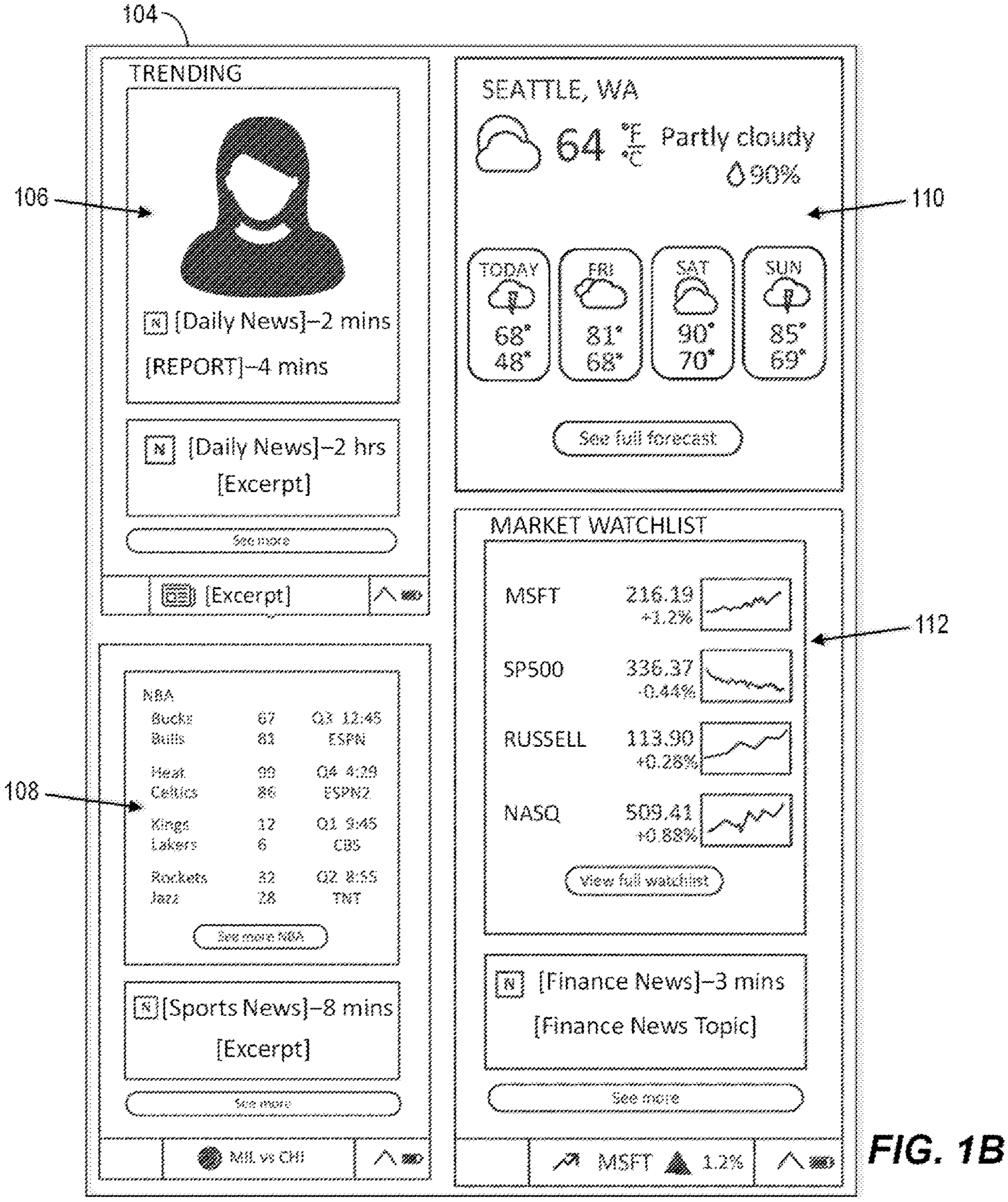
FIG. 1B depicts an example flyout frame in accordance with one or more embodiments.

To illustrate, consider the Windows 10 and Windows 11 preview and flyout products. FIG. 1A illustrates an example preview frame 102 in accordance with one or more embodiments of the present invention. FIG. 1B illustrates an example flyout frame 104 in accordance with one or more embodiments of the present invention. The preview frame 102 and flyout frame 104 work cooperatively to deliver useful information to end user devices.

In some embodiments, the preview frame 102, also known as the Windows taskbar preview or taskbar thumbnail, is a graphical user interface (GUI) element that provides a visual, rich preview and/or summary of the contents of the flyout frame 104. The preview frame 102 can include, for example, a brief local weather widget (as shown in FIG. 1A). In some embodiments, the displayed content of the preview frame 102 rotates between various elements of the underlying flyout frame 104 (refer to FIG. 1B). In this manner, the preview frame 102 helps users to quickly identify information of interest and to determine whether to engage with the previewed content using a relatively small interface footprint.

In some embodiments, the flyout frame 104 is displayed when a user clicks, hovers, or otherwise interacts with the preview frame 102. The flyout frame 104 is a GUI element that includes a more comprehensive information display than the preview frame 102. The flyout frame 104 can include, for example, a trending news widget 106, a sports widget 108, a weather widget 110, a market (finance) widget 112, real-time notifications (not separately shown), and/or any of a variety of other types of informational widgets (e.g., updates about new content releases, personalized recommendations, important announcements, etc.). In this manner, the flyout frame 104 leverages a larger interface footprint to provide users with more detailed information, but doing so using a frame that is only visible when desired by the user. Compare, for example, the weather detail provided in the preview frame 102 against the more comprehensive multiple day forecast within the weather widget 110.

To populate the preview frame 102 and the flyout frame 104, a server proactively pushes the latest taskbar preview data along with the flyout data to a client device at regular intervals. For example, the server (or a service running on or with the server) can push preview data and flyout data to the client(s) at an interval of 35 minutes, or 10 minutes, or 1 hour, or 4 hours, etc. The preview data and flyout data, collectively the "update content", contains all of the data that is used to not only render the preview frame 102 (as shown in FIG. 1A), but also all the data to power the flyout frame 104 (as shown in FIG. 1B), including for example, news data, weather data, finance data, notification data, etc., in case that a user hovers, clicks, or otherwise interacts with the preview frame 102 to trigger the flyout frame 104.

Providing update content sufficient to power both the preview frame 102 and the flyout frame 104 requires proactively pushing a large amount of data to a large number of client devices at the selected update interval. Notably, this relatively large data transfer requirement persists whether or not the end user(s) actually interact with the flyout frame 104.

This disclosure introduces an intelligent and proactive content service delivery framework that solves two related issues with current content delivery services: (1) current implementations proactively send update content to the client(s) at a fixed interval; and (2), when sending the update content, the server sends all of the data (e.g., a full suite of data for powering both the preview frame 102 and the flyout frame 104). To address these limitations, in some embodiments, an intelligent and proactive content service delivery system is trained to dynamically select the update interval (e.g., 10 minutes, 35 minutes, 1 hour, etc.) as well as the breadth of the update content (e.g., data for just the preview frame 102 or data for both the preview frame 102 and the flyout frame 104) for each client device. Advantageously, configuring a content service delivery system with dynamic update intervals and dynamic content breadth in accordance with one or more embodiments can reduce the data transmission requirements associated with proactive content delivery in a manner that is not noticeable to the vast majority of end users. In other words, a significant savings in data transmission volume can be realized without sacrificing the end user experience.

An intelligent and proactive content service delivery system trained for dynamic update intervals and content breadth in accordance with one or more embodiments offer several technical advantages over other proactive content delivery services. Notably, the intelligent and proactive content service delivery system described herein can reduce data transmission volumes between the server and low engagement user(s) (i.e., those users expected to skip or otherwise ignore a content update), freeing transmission capacity to fund initiatives for highly engaged users.

Existing works use machine learning techniques to save server capacity by learning how best to reactively respond to a given client request. In other words, when a client sends a request to the server for content, the server attempts to react in an efficient way, for example, by providing only strictly necessary data to satisfy a given request.

In contrast, this work offers a server-side, proactive solution that can reduce data transmission volumes in a manner that is not limited to client-side request optimizations. Aspects of the present disclosure leverage server-side machine learning techniques to estimate a degree and/or likelihood of user engagement with a given content update. Full or partial content updates can then be proactively delivered to each user at an appropriate interval using their respective estimated level of user engagement. For example, a partial proactive content update (i.e., one sufficient to power the preview frame 102 but not the flyout frame 104) can be pushed to client devices having a low estimated likelihood of engagement with the respective content. Conversely, a full proactive content update (i.e., one sufficient to power both the preview frame 102 and the flyout frame 104) can be pushed to client devices for users estimated to interact with the flyout frame 104.

Figure 2:
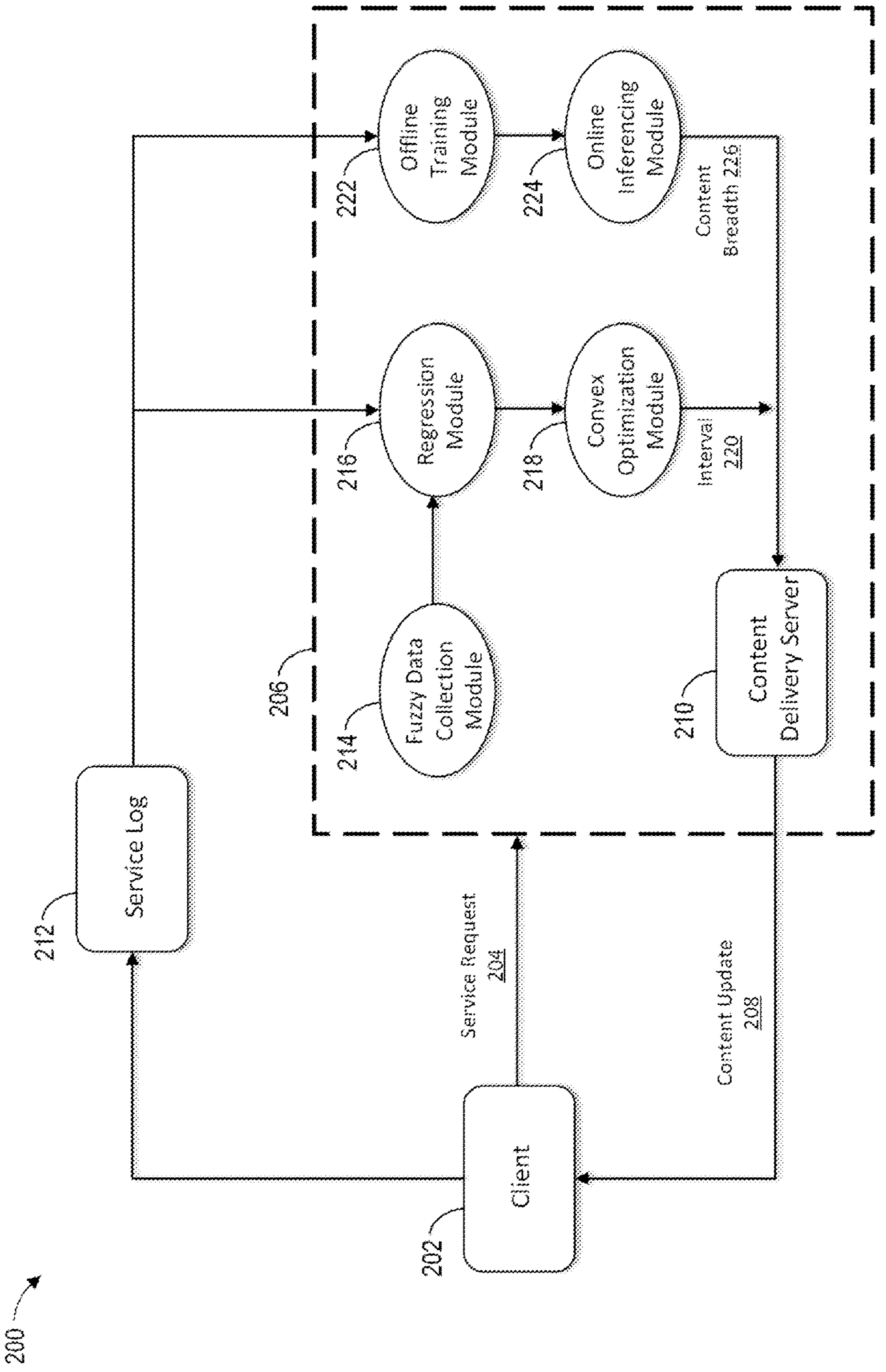
FIG. 2 depicts a block diagram for proactive content service delivery in accordance with one or more embodiments.

FIG. 2 depicts a block diagram 200 for proactive content service delivery in accordance with one or more embodiments of the present invention. As shown in FIG. 2, a client 202 can make a request for service via a service request 204 to a proactive content delivery system 206. The client 202 is not meant to be particularly limited, but can include, for example, a personal computer (desktops, laptops, e-reader, etc.), a smartphone, a tablet, a smart home device, a wearable device (smartwatch, fitness tracker, etc.), a smart TV, a streaming device, a gaming console, a headset (virtual reality, augmented reality, etc.), and/or any other type of device used for consumer access to information streams.

The service request 204 can include information necessary to initiate content updates from the proactive content delivery system 206. In some embodiments, the service request 204 includes identifying information for the client 202, such as an IP address, a device name, etc., and an express authorization and/or request for content updates.

The proactive content delivery system 206 receives and processes the service request 204. In some embodiments, the proactive content delivery system 206 builds a full or partial content update 208 and delivers the content update 208 to a list of clients (e.g., client 202) that have provided a service request 204. In some embodiments, the content update 208 is transmitted from a content delivery server 210 of the proactive content delivery system 206 to the client(s) 202. Notably, the convent delivery server 210 determines when, and how often, to respond to service requests 204. In other words, whether to respond, and the frequency of such responses, is determined server-side rather than strictly responsive to receiving the service request 204.

In some embodiments, the proactive content delivery system 206 receives client log data from a service log 212. The service log 212 maintains a record of client-side actions (also referred to as an action sequence) for the client 202. In some embodiments, the service log 212 tracks actions with respect to the preview frame 102 and the flyout frame 104. For example, the service log 212 can track whether the client 202 hovered (via, e.g., a mouse or other input device) the preview frame 102 and whether the client 202 clicked one or more widgets of the flyout frame 104. In some embodiments, the service log 212 sits as an intermediary between the client 202 and the proactive content delivery system 206. In this manner, the proactive content delivery system 206 can be ensured access to various action metrics of the client 202.

In some embodiments, the proactive content delivery system 206 includes one or more modules configured to identify an appropriate content delivery interval as well as an appropriate content breadth. Once the content interval and breadth is determined, the content update 208 can be built and delivered to the client 202. Identification of the content delivery interval and content breadth is discussed in greater detail below.

Best Interval

In some embodiments, the proactive content delivery system 206 includes a fuzzy data collection module 214, a regression module 216, and a convex optimization module 218 configured to identify a content delivery interval 220. In some embodiments, the fuzzy data collection module 214 and/or the proactive content delivery system 206 breaks the interval problem down into a plurality of configurable time and user dimensions. For example, the interval problem can be split amongst two or more time cohorts and, for each time cohort, further into two or more user cohorts, for a total of four or more unique time-user cohorts.

To illustrate, consider a scenario where two time cohorts and four user cohorts are defined, giving eight unique combinations of time and user cohorts. The time cohorts can include, for example, a first bucket for day and a second bucket for night. For example, the day bucket can correspond to a local time between 6 am and 10 μm and the night bucket can correspond to a local time between 10 μm and 6 am. It should be understood that the particular time intervals chosen for a respective cohort are not meant to be particularly limited. Other time cohort definitions are possible (e.g., 12 am to 12 μm, 8 am to 6 pm, etc.), including definitions splitting time across any desired number of cohorts/buckets (e.g., 3, 4, 6, 8, 12, 24, etc. time buckets), and all such configurations are within the contemplated scope of this disclosure.

The user cohorts can include, for example, a first bucket for cold users, a second bucket for low engagement users, a third bucket for mid engagement users, and a fourth bucket for high engagement users. For example, the cold users bucket can correspond to the set of users having a number of core page views (i.e., interactions with the preview frame 102 and/or the flyout frame 104) of less than 3 over the prior 7 days (as tracked, for example, by the service log 212). Similarly, the low engagement users bucket can correspond to the set of users having a number of core page views between 3 and 10 over the prior 7 days, the mid engagement users bucket can correspond to the set of users having a number of core page views between 11 and 20 over the prior 7 days, and the high engagement users bucket can correspond to the set of users having a number of core page views greater than 20 over the prior 7 days. Again, it should be understood that the particular number of core page views chosen for a respective cohort is not meant to be particularly limited. Other user cohort definitions are possible (e.g., very high engagement having core page views over 40, redefining cold users as those with zero core page views, etc.), including definitions splitting users across any desired number of cohorts/buckets (e.g., 2, 3, 4, 5, 10, 20, etc. user cohorts), and all such configurations are within the contemplated scope of this disclosure.

In some embodiments, the fuzzy data collection module 214 is configured to complete a data gathering process whereby one or more test intervals are run against each of the unique time-user cohorts. The fuzzy data collection module 214 can then empirically measure one or more output conditions which are observed following the application of the respective test intervals. In some embodiments, the fuzzy data collection module 214 is configured to measure a first output ($y_1$) equal to a number of daily active users (DAUs) and a second output ($y_2$) equal to a number of requests per second (RPS).

Continuing with the previous example, there are eight unique time-user cohorts: day: cold ($x_1$), day: low ($x_2$), day: mid ($x_3$), day: high ($x_4$), night: cold ($x_5$), night: low ($x_6$), night: mid ($x_7$), and night: high ($x_8$). In some embodiments, the fuzzy data collection module 214 is configured to initialize one or more test intervals for each of the eight unique time-user cohorts. In some embodiments, the test intervals are randomly determined. In some embodiments, the test intervals are selected from a predetermined list. For example, assume the fuzzy data collection module 214 selects, for the eight cohorts $x_1, x_2, \ldots, x_8$, the following test intervals (in minutes): $x_1=35$, $x_2=20$, $x_3=25$, $x_4=45$, $x_5=55$, $x_6=35$, $x_7=15$, and $x_8=20$. Assume further that the observed values for the first output ($y_1$) and the second output ($y_2$) are 100,000 and 80,000, respectively. This process can be repeated for any number of additional test intervals. For example, three example test interval sets and their respective observed outputs could be:

First test intervals ($x_1=35$, $x_2=20$, $x_3=25$, $x_4=45$, $x_5=55$, $x_6=35$, $x_7=15$, and $x_8=20$); observed output ($y_1=100{,}000$ and $y_2=80{,}000$).

Second test intervals ($x_1=15$, $x_2=20$, $x_3=45$, $x_4=15$, $x_5=50$, $x_6=15$, $x_7=25$, and $x_8=40$); observed output ($y_1=120{,}000$ and $y_2=60{,}000$).

Third test intervals ($x_1=55$, $x_2=40$, $x_3=15$, $x_4=15$, $x_5=25$, $x_6=25$, $x_7=15$, and $x_8=30$); observed output ($y_1=110{,}000$ and $y_2=40{,}000$).

In some embodiments, the observed outputs (i.e., $y_1$ and $y_2$) and their respective inputs (i.e., the time-user cohorts $x_1 \ldots x_N$) are provided to the regression module 216. In some embodiments, the regression module 216 is configured to learn two linear regression models ($f_1$ and $f_2$), where $y_1=f_1(x_1 \ldots x_N)$ and $y_2=f_2(x_1 \ldots x_N)$. Observe that the linear regression models $f_1$ and $f_2$ provide an estimate of the observed outputs $y_1$ and $y_2$, respectively, as a function of the inputs ($x_1 \ldots x_N$). An example pair of linear regression models could be:

$$y_1 = 0.5 * x_1 + 0.3 * x_2 + \ldots + 0.9 * x_8 \quad (1)$$

$$y_2 = 0.3 * x_1 + 0.2 * x_2 + \ldots + 0.7 * x_8 \quad (2)$$

In some embodiments, the linear regression models $f_1$ and $f_2$ are provided to the convex optimization module 218. In some embodiments, the inputs ($x_1 \ldots x_N$) are transformed to ($1/x_1 \ldots 1/x_N$) before they are input to the linear regression models $f_1$ and $f_2$ (that is, the inverse values can be used as input). In some embodiments, the convex optimization module 218 is configured to determine the content delivery interval 220 for each of the time-user cohorts $x_1 \ldots x_N$. In some embodiments, the convex optimization module 218 is configured to determine an optimal set of intervals for a given definition of time-user cohorts $x_1 \ldots x_N$ that maximizes $y_1$.

In some embodiments, the convex optimization module 218 is configured to determine an optimal set of intervals for a given definition of time-user cohorts $x_1 \ldots x_N$ that maximizes $y_1$ (also referred to as delta DAU) subject to one or more constraints. In some embodiments, the one or more constraints includes a threshold maximum limit on an increase in $y_2$ (also referred to as delta RPS). For example, the convex optimization module 218 may maximize $y_1$ subject to a predetermined maximum increase in $y_2$ of 10 percent (or 5 percent, 20 percent, 33 percent, etc.). That is, maximize $y_1$ subject to $y_2 \leq$ some predetermined threshold of growth. In some embodiments, the one or more constraints includes a minimum and/or maximum interval for each of the time-user cohorts $x_1 \ldots x_N$. For example, the convex optimization module 218 may maximize $y_1$ subject to a minimum interval of 15 minutes (or 5 minutes, 20 minutes, 55 minutes, etc.) and a maximum interval of 35 minutes (or 25 minutes, 33 minutes, 125 minutes, etc.). In some embodiments, the one or more constraints includes both a predetermined maximum increase in $y_2$ and minimum and/or maximum interval requirements.

In some embodiments, the optimal set of intervals found for the respective time-user cohorts that maximizes $y_1$ subject to any constraints, as discussed above, is provided to the content delivery server 210 as a content delivery interval 220. At runtime, the content delivery server 210 and/or the convex optimization module 218 can select the best interval for the client 202 according to the hour of the day and the specific user cohort for the client 202. As used herein, the "best" interval refers to the optimal interval determined by the convex optimization module 218 for the respective time-user cohort of the client 202. For example, if the client 202 is a high engagement user (as noted, e.g., by click counts in the service log 212) and the local time is 3 PM, the interval for the $x_4$ cohort (day: high) can be selected as the best interval.

Best Content

Figure 3:
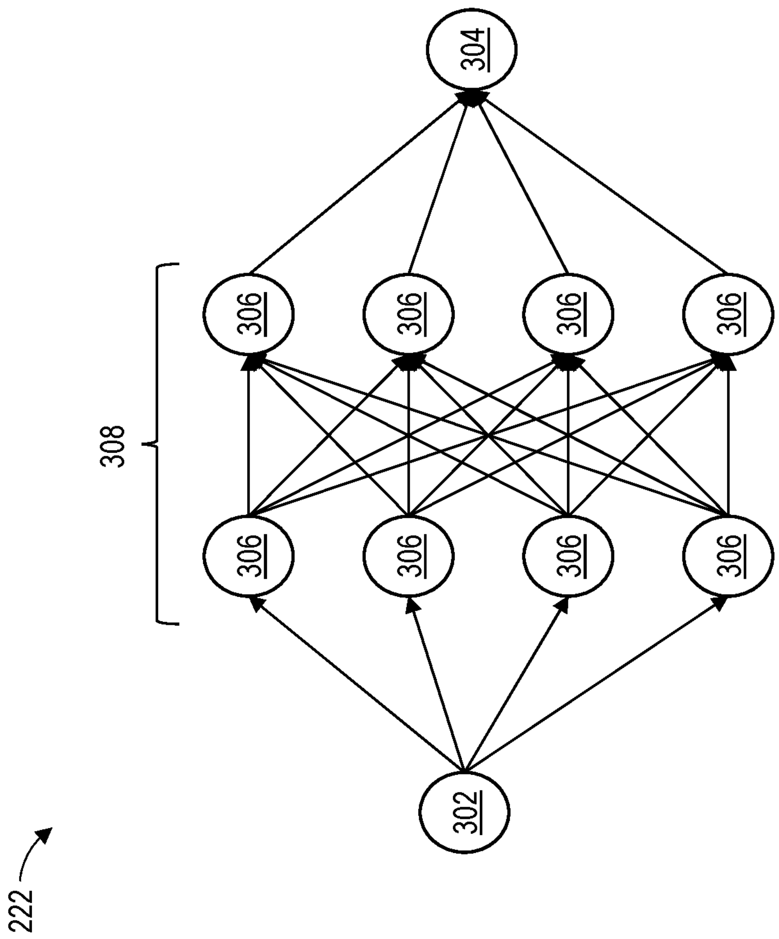
FIG. 3 depicts an example offline training module in accordance with one or more embodiments.

In some embodiments, the proactive content delivery system 206 includes an offline training module 222 and an online inferencing module 224 configured to identify a content breadth 226 (i.e., whether the content delivery server 210 should provide a full or partial update). In some embodiments, the offline training module 222 is a classification model trained to predict whether a particular content update will result in an impression (that is, will the flyout frame 104 be opened). An example structure for the offline training module 222 is shown in FIG. 3.

In some embodiments, when the predicted probability of an impression (e.g., of opening and/or otherwise interacting with the content) is greater than a predetermined threshold, the respective content update should be a full update; otherwise, the content update should be a partial one. In this manner, full updates are provided to the client 202 only when there is an expectation that the flyout frame 104 will be accessed (measured, e.g., according to the predicted probability of opening). Conversely, partial updates are provided to the client 202 when the predicted probability of opening is lower than the predetermined threshold.

In some embodiments, training the offline training module 222 includes a training data generation process whereby each unique prior content update (all or a subset of all prior content updates) are considered as a single data sample. In some embodiments, each data sample is labeled as a positive sample or as a negative sample. In some embodiments, the training data (the positive and negative samples) is used to train the offline training module 222.

In some embodiments, a positive sample denotes a content update known to have resulted in an impression (i.e., a content update that can be matched and/or joined to impression log data in the service log 212). In some embodiments, a negative sample denotes a content update that did not result in an impression (i.e., a content update that can not be matched and/or joined to impression log data in the service log 212). In other words, a positive sample is a content update that was seen by users and a negative sample is a content update that was not seen by users.

In some embodiments, a positive sample denotes a content update known to have resulted in an impression within the content delivery interval 220. For example, a full update made at 9 AM at an update interval of 35 minutes which resulted in an impression (e.g., a user opens the flyout frame 104) at 9:12 AM is a positive sample; while a full update made at 9 AM at an update interval of 35 minutes which resulted in an impression (e.g., a user opens the flyout frame 104) at 9:45 AM is a negative sample. Notably, labeling content updates having impressions which occur outside of the update interval in this manner allows for further reductions in bandwidth, as partial updates provided to those users can be overwritten with a new content update (partial or full) before the user interacts with the flyout frame 104.

In some embodiments, the training data generation process includes a reweight strategy to emphasize different impressions according to their respective interaction type. For example, a content update associated with a click (contributing, e.g., to DAU) can be labeled as a positive sample having a high weight value, while a content update associated with a mouse hover can be labeled as a positive sample having a relatively lower weight value. In this manner, more desirable impression types can be assigned a higher learning weight by the proactive content delivery system 206.

In some embodiments, each training data (the positive and negative samples) is defined in terms of a plurality of input features for training the offline training module 222. Table 1 provides a list of example features for training a classification model (e.g., offline training module 222). The particular features described in Table 1 are illustrative only and are not meant to be particularly limited. Other features are possible and all such configurations are within the contemplated scope of this disclosure. Features can include, generally, information about the client and/or user (e.g., user-specific metadata, preferences, demographic information, etc.), metadata regarding the current request (e.g., local client time, client location, time since last request, etc.), and/or metadata regarding the content update (e.g., which data feeds have been selected for the next content update, time since a given field such as news or sports has been updated, etc.).

TABLE 1

Feature Types

| Type | Description/Details | Examples |
|---|---|---|
| Batch Features - User Actions | General actions, preview and flyout actions, badge actions, etc. | Number of preview hovers in past 30/10/1 day(s). Number of flyout clicks in past 7/1 day(s). Counter for number of times a "top stories" card was clicked in past 30 days. |
| User Profile Features | Tagged interests in user's OS and/or browser profile. | Users subscribe to "Sports" interest in OS profile. User's embedding vectors. User searches finance related content. |
| Near Real Time Features | Various time increments, such as 2 h, 6 h, 12 h, 24 h | Count of users that have viewed the weather card in past 2 h, 6 h, etc. Count of users that have "liked" a news widget item over last hour. |
| Request Level Features | Data and metadata for the request itself, such as time, location, identification of widgets of flyout, what's on preview, etc. | Local time for received request, e.g., a range from 1 to 24. Whether finance/news/weather/etc. is in rotation for preview. Whether stock card exists for current flyout. |

In some embodiments, the features can be characterized by their predictive ability within the offline training module 222 (that is, in their accuracy to predict whether a full or partial update is required). A sorted list of example features and their relative predictive importance is provided in Table 2.

TABLE 2

Predictive Importance of Features

| Feature | Importance |
|---|---|
| How many times has a user opened the preview in the past 7 days? | 1 |
| Does a user's interest (e.g., sports) match a widget of full update? | 0.92 |
| Total core page views over the last 30 days. | 0.59 |
| How many times has a user viewed the news card in past 6 hours? | 0.46 |
| How many times has user viewed the top stories news card in the past 6 hours? | 0.38 |
| Current local time for user? | 0.31 |
| Average core page views over past week, month, etc .? | 0.27 |

In some embodiments, in the runtime, a service request 204 from the client 202 and/or the service log 212 can carry over various Request Level Features from the client side (refer to Table 1). In some embodiments, various other features (near real time features, batch features, etc.) are sourced from the server side.

In some embodiments, the optimal content (e.g., partial or full update) for the respective update, as discussed above, is provided to the content delivery server 210 as a content breadth 226. At runtime, the online inferencing module 224 can select the best update type (full or partial) for the client 202. As used herein, the "best" content refers to a full update (i.e., to power both the preview frame 102 and the flyout frame 104) or a partial update (i.e., to power only the preview frame 102) as indicated as the output from the online inferencing module 224 when passing, to the online inferencing module 224, the features at runtime.

In some embodiments, the online inferencing module 224 inputs a single feature vector that is itself a combination of all input features, into the offline training module 222, and receives, as an output, a score indicating whether a partial or full content update is required (the content breadth 226). In some embodiments, a score is generated for each candidate content item. In some embodiments, a full content update is indicated for scores above a predetermined threshold. For example, a full content update can be indicated when the score (i.e., the predicted likelihood of interaction) is greater than 10%, 25%, 50%, 80%, etc. For example, if the User Profile Features indicate that the user prefers sports-related content, the Near Real Time Features indicate the user has clicked sports data within the last hour, and the content update includes sports information, the output from the online inferencing module 224 may be 88%-indicating a full update.

As shown in FIG. 3, the offline training module 222 can include an input node 302, an output node 304, and a plurality of hidden nodes 306 distributed amongst one or more hidden layers 308. For example, the offline training module 222 can include two hidden layers 308, each having four hidden nodes 306 (as shown). The number of hidden layers and nodes is not meant to be particularly limited. In some embodiments, the input node 302 is a feature vector encoding a plurality of features as described above.

In some embodiments, the offline training module 222 is initialized by setting, manually or randomly, the weights of the various hidden nodes 306 of the hidden layers 308 to some initial value(s). In some embodiments, the weights of the various hidden nodes 306 are initialized using pre-trained weights taken, for example, from a similar and/or prior model. In some embodiments, the weights of the various hidden nodes 306 are initialized to the same value, or alternatively, to different values.

In some embodiments, the offline training module 222 is trained (i.e., the weights of the hidden nodes 306 are determined) by successively inputting different feature vectors (i.e., different feature spaces) into the input node 302 and, for each training input, adjusting one or more weights of the hidden nodes 306 until a value of the output node 304 matches the desired content update outcome. In short, weights can be adjusted until the offline training module 222 provides reasonable (within any level of accuracy, subject only to training time and depth) determinations of full or partial content updates.

Figure 4:
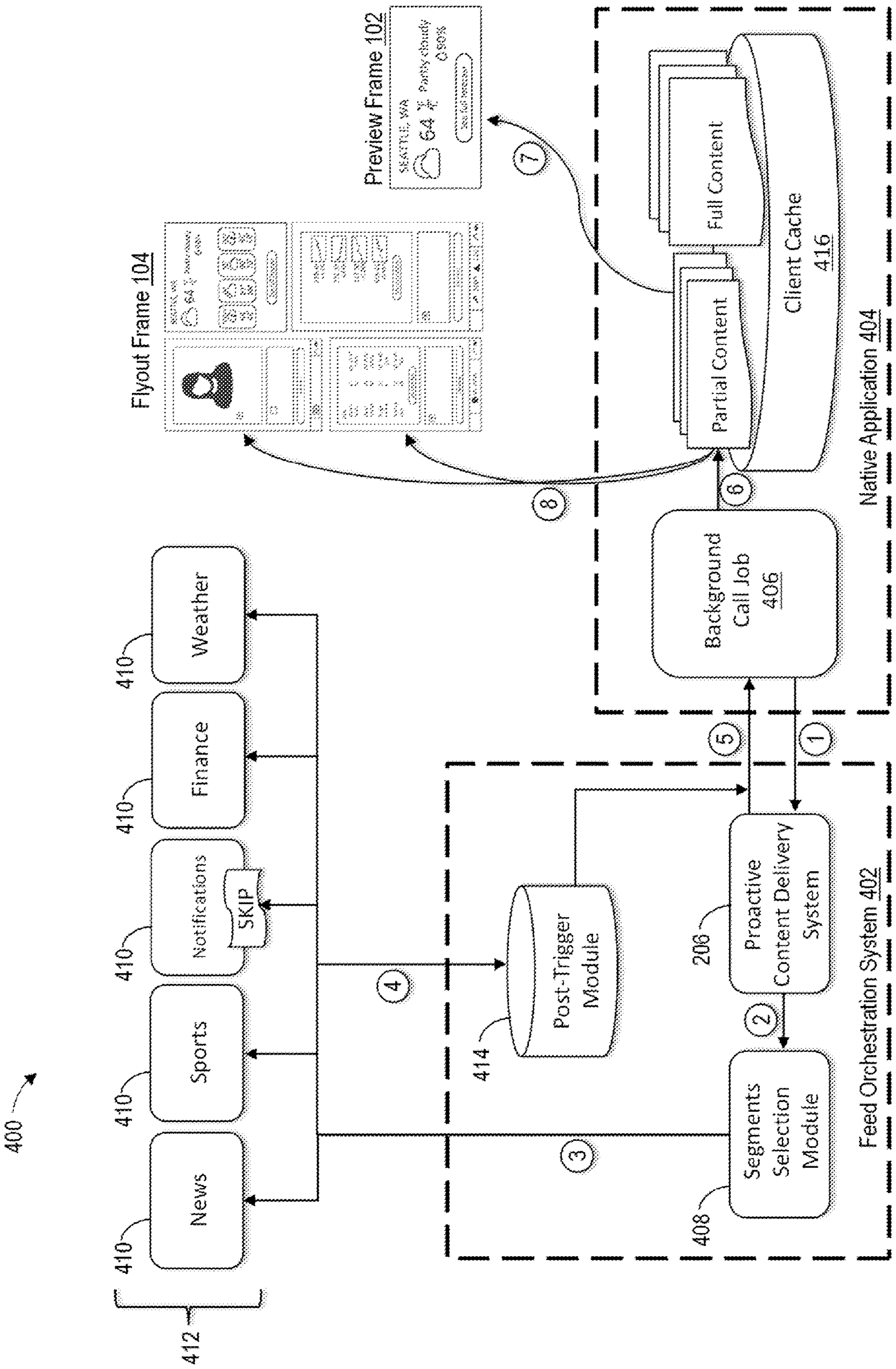
FIG. 4 depicts a block diagram for proactive content service delivery in accordance with one or more embodiments.

FIG. 4 depicts a block diagram 400 for proactive content service delivery in accordance with one or more embodiments of the present invention. As shown in FIG. 4, the proactive content delivery system 206 (refer to FIG. 2 for additional internal details) can be incorporated within or as part of a feed orchestration system 402.

In some embodiments, a native application 404 (e.g., a local application and/or shell of the client 202 described with respect to FIG. 2) can make, at step ①, a passive call (e.g., a service request 204) via a background call job 406 to the proactive content delivery system 206. Notably, the allowed interval between passive calls is controlled on the server-side by the proactive content delivery system 206 as discussed previously herein. For example, in some embodiments, the native application 404 makes a passive call to the proactive content delivery system 206 every N minutes, where N is the content delivery interval 220 determined by the proactive content delivery system 206.

In some embodiments, the proactive content delivery system 206, responsive to receiving the service request 204 indicating that the client 202 intends to participate in the next content update, calls, at step ②, a segments selection module 408. In some embodiments, the call includes information indicating that the service request 204 is, or is not, eligible for a partial update. Whether a given content update is a partial update, or a full update, can be determined in accordance with one or more embodiments described previously herein.

In some embodiments, the segments selection module 408 selects, at step ③, one or more service recommendations 410 (as shown, "News", "Sports", "Notifications", "Finance", and "Weather" service recommendations) from one or more update sources 412 to populate the content update. In some embodiments, the segments selection module 408 polls the update sources 412 to determine, which, if any, have content available for a content update. For example, the "News" service recommendation 410 can be polled to determine whether any new articles are available since the last content update.

In some embodiments, such as when the current service request 204 is eligible for partial content, the segments selection module 408 only needs to poll a single source of the update sources 412. For example, the segments selection module 408 can poll the "Weather" service recommendation 410 and can skip the remaining update sources 412. In this manner, only the bare data needed to populate the preview frame 102 is polled (the additional data from the other update sources 412 for the flyout frame 104 is not needed for a partial update). In some embodiments, the single source of the update sources 412 selected for a partial update rotates, randomly and/or via predetermined schedule, among the update sources 412.

In some embodiments, the one or more service recommendations 410 selected by the segments selection module 408 (refer to step ③) are sent, at step ④, to a post-trigger module 414. In some embodiments, the post-trigger module 414 assembles the selected one or more service recommendations 410 (defining, e.g., a full or partial content update 208) for delivery by the proactive content delivery system 206. In some embodiments, the post-trigger module 414 and/or the proactive content delivery system 206 deliver, at step ⑤, the content update 208 to the background call job 406 and/or the native application 404. In some embodiments, the content update 208 includes metadata indicating that the response is a full response or a partial response. In some embodiments, the content update 208 does not indicate to the native application 404 whether the response is a full response or a partial response.

In some embodiments, the background call job 406 and/or the native application 404 receives and caches, at step ⑥, the content update 208 in a local client cache 416. The native application 404 renders, at step ⑦, the preview frame 102 from the cached content update 208.

For full updates, the remaining cached data stays in cache to support, if needed (e.g., a user clicks and/or hovers the preview frame 102), a render, at step ⑧, of the flyout frame 104. For partial updates, the data needed to support the flyout frame 104 is not in cache. In this scenario, the background call job 406 will, in response to a user invoking the flyout frame 104 and determining that the data is not cached, make a direct request to the feed orchestration system 402 for the needed data (i.e., an out-of-schedule request). The entire process (i.e., steps ① to ⑧ can then be repeated for the next content update according to the content interval set by the proactive content deliver system 206.

Figure 5:
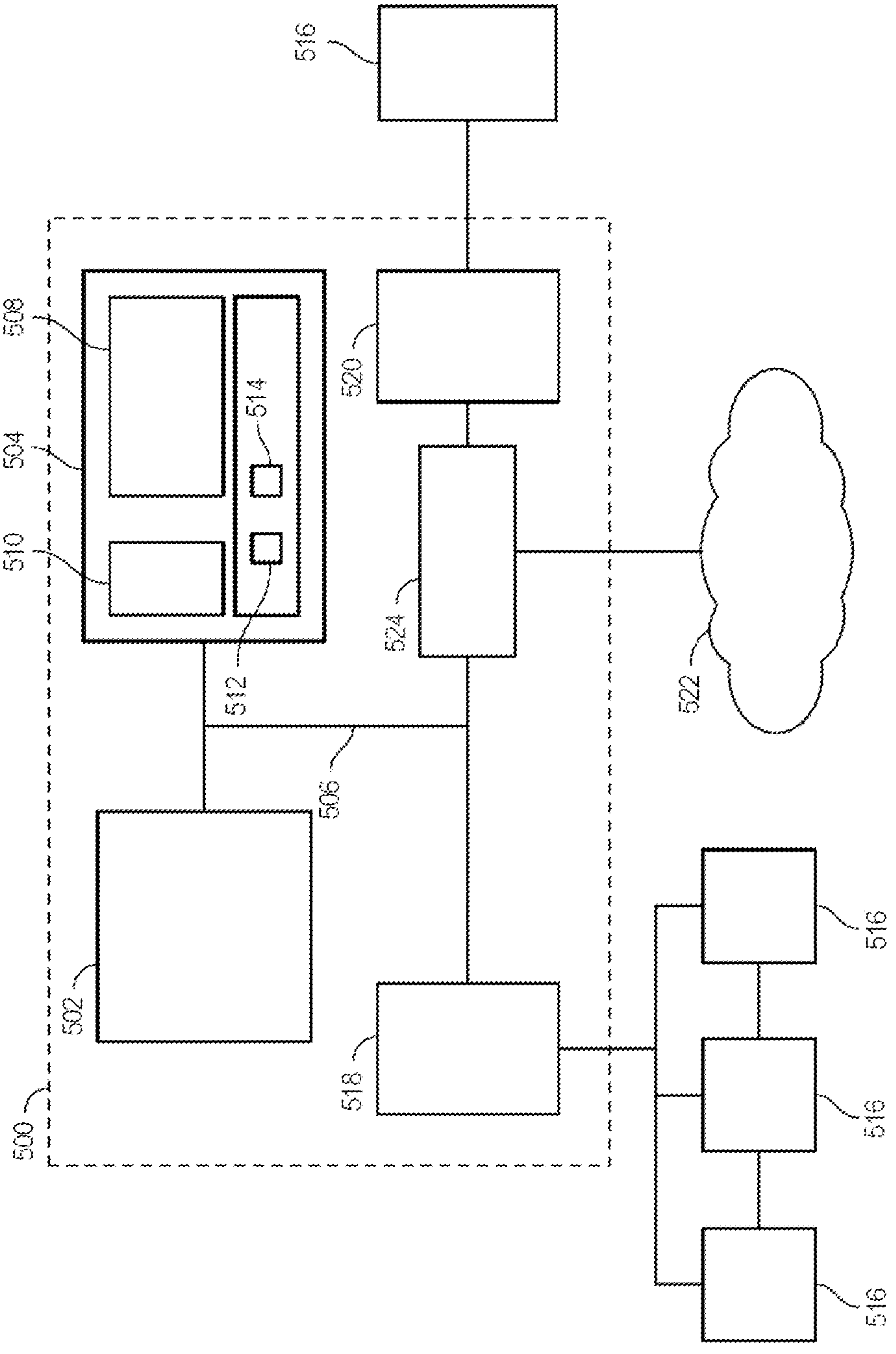
FIG. 5 depicts a block diagram of a computer system according to one or more embodiments.

FIG. 5 illustrates aspects of an embodiment of a computer system 500 that can perform various aspects of embodiments described herein. In some embodiments, the computer system(s) 500 can implement and/or otherwise be incorporated within or in combination with a proactive content delivery system (e.g., the proactive content delivery system 206 described with respect to FIG. 2). In some embodiments, a computer system 500 can be implemented client-side. For example, a computer system 500 can be configured to provide service requests (e.g., service requests 204) and to receive and display content updates (e.g., full or partial content update 208) using a user interface. In some embodiments, a computer system 500 can be implemented server-side. For example, a computer system 500 can be configured to determine the content delivery interval 220 and/or the content breadth 226 as described previously herein.

The computer system 500 includes at least one processing device 502, which generally includes one or more processors or processing units for performing a variety of functions, such as, for example, completing any portion of the workflows 100, 300, 400 described previously herein. Components of the computer system 500 also include a system memory 504, and a bus 506 that couples various system components including the system memory 504 to the processing device 502. The system memory 504 may include a variety of computer system readable media. Such media can be any available media that is accessible by the processing device 502, and includes both volatile and non-volatile media, and removable and non-removable media. For example, the system memory 504 includes a non-volatile memory 508 such as a hard drive, and may also include a volatile memory 510, such as random access memory (RAM) and/or cache memory. The computer system 500 can further include other removable/non-removable, volatile/non-volatile computer system storage media.

The system memory 504 can include at least one program product having a set (e.g., at least one) of program modules that are configured to carry out functions of the embodiments described herein. For example, the system memory 504 stores various program modules that generally carry out the functions and/or methodologies of embodiments described herein. A module or modules 512, 514 may be included to perform functions related to the workflow 100, 300, 400 as described previously herein. The computer system 500 is not so limited, as other modules may be included depending on the desired functionality of the computer system 500. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 502 can also be configured to communicate with one or more external devices 516 such as, for example, a keyboard, a pointing device, and/or any devices (e.g., a network card, a modem, etc.) that enable the processing device 502 to communicate with one or more other computing devices. Communication with various devices can occur via Input/Output (I/O) interfaces 518 and 520.

The processing device 502 may also communicate with one or more networks 522 such as a local area network (LAN), a general wide area network (WAN), a bus network and/or a public network (e.g., the Internet) via a network adapter 524. In some embodiments, the network adapter 524 is or includes an optical network adaptor for communication over an optical network. It should be understood that although not shown, other hardware and/or software components may be used in conjunction with the computer system 500. Examples include, but are not limited to, microcode, device drivers, redundant processing units, external disk drive arrays, RAID systems, and data archival storage systems, etc.

Figure 6:
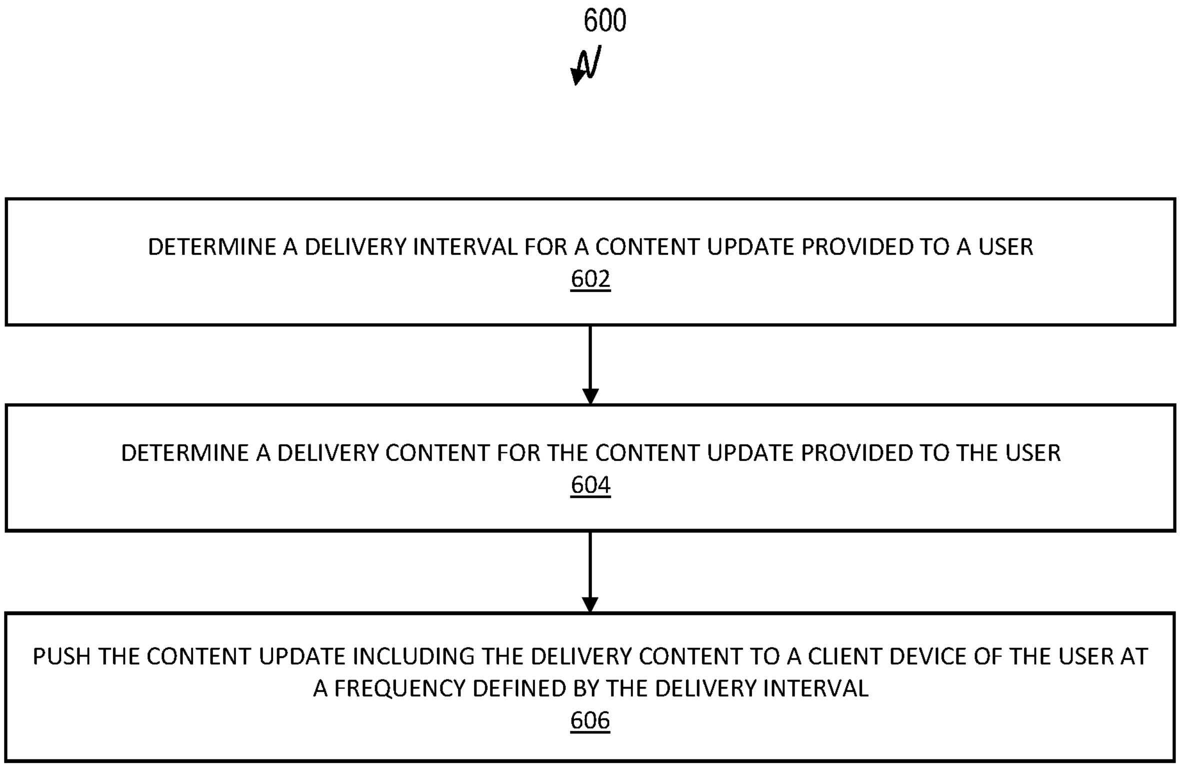
FIG. 6 depicts a flowchart of a method for proactive content service delivery in accordance with one or more embodiments.

Referring now to FIG. 6, a flowchart 600 for proactive content delivery is generally shown according to an embodiment. The flowchart 600 is described with reference to FIGS. 1A to 5 and may include additional steps not depicted in FIG. 6. Although depicted in a particular order, the blocks depicted in FIG. 6 can be, in some embodiments, rearranged, subdivided, and/or combined.

At block 602, a delivery interval is determined for a content update provided to a user. In some embodiments, determining the delivery interval includes defining a plurality of delivery interval dimensions, where each delivery interval dimension includes a unique combination of one time cohort of two or more time cohorts and one user cohort of two or more user cohorts. In some embodiments, determining the delivery interval includes determining a time cohort and a user cohort for the user and selecting a predetermined delivery interval of the delivery interval dimension matching the time cohort and the user cohort of the user as the delivery interval.

In some embodiments, determining the delivery interval further includes determining a first linear regression function that estimates a number of daily active users as a function of test intervals applied to each of the plurality of delivery interval dimensions; determining a second linear regression function that estimates a number of requests per second as a function of the test intervals applied to each of the plurality of delivery interval dimensions; and determining, for each delivery interval dimension, a predetermined delivery interval that maximizes the first linear regression function subject to a threshold maximum allowable change in the second linear regression function.

In some embodiments, the threshold maximum allowable change in the second linear regression function comprises an increase of ten percent in the number of requests per second.

In some embodiments, the test intervals applied to each of the plurality of delivery interval dimensions are randomly initialized.

At block 604, a delivery content is determined for the content update provided to the user. In some embodiments, determining the delivery content includes training a classification model to predict whether content will result in an impression; inputting, into the classification model, the content update; receiving, as output from the classification model, an impression score for the content update; and selecting one of a full update and a partial update as the delivery content from the impression score.

In some embodiments, selecting one of a full update and a partial update includes, when the impression score is greater than a predetermined threshold, selecting the full update; and when the impression score is less than the predetermined threshold, selecting the partial update.

In some embodiments, training the classification model to predict whether content will result in an impression includes labeling each content update of a plurality of unique prior content updates as one of a positive sample and a negative sample. In some embodiments, a positive sample denotes a content update known to have resulted in an impression and a negative sample denotes a content update that did not result in an impression.

In some embodiments, training the classification model to predict whether content will result in an impression further includes weighting each content update of the plurality of unique prior content updates according to a respective interaction type.

In some embodiments, training the classification model to predict whether content will result in an impression further includes defining each content update of the plurality of unique prior content updates according to a plurality of input features; inputting, into the classification model, the plurality of input features for each content update as a single respective input feature vector; and adjusting one or more internal weights of the classification model based on the input feature vectors.

In some embodiments, the plurality of input features includes user-specific metadata including a content preference of the user, demographic information, a local time, a location of the user, and information for one or more prior impressions made by the user.

At block 606, the content update including the delivery content is pushed to a client device of the user at a frequency defined by the delivery interval.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof. The term “or” means “and/or” unless clearly indicated otherwise by context.

The terms “received from”, “receiving from”, “passed to”, “passing to”, etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method for proactive content service delivery, the method comprising:

- determining a delivery interval for a content update provided to a user, wherein determining the delivery interval comprises:
  - defining a plurality of delivery interval dimensions, each respective delivery interval dimension of the plurality of delivery interval dimensions comprising a unique combination of one time cohort of two or more time cohorts and one user cohort of two or more user cohorts;
  - determining a time cohort of the two or more time cohorts and a user cohort of the two or more user cohorts for the user; and
  - selecting a predetermined delivery interval of the delivery interval dimension matching the determined time cohort and the determined user cohort of the user as the delivery interval;
- determining a delivery content for the content update provided to the user, wherein determining the delivery content comprises:
  - training a classification model to predict whether content will result in an impression;
  - inputting, into the classification model, the content update;
  - receiving, as output from the classification model, an impression score for the content update; and
  - selecting one of a full update and a partial update as the delivery content from the impression score; and
- pushing the content update comprising the delivery content to a client device of the user at a frequency defined by the delivery interval.

2. The method of claim 1, wherein determining the delivery interval further comprises:

- determining a first linear regression function that estimates a number of daily active users as a first function of test intervals applied to each of the plurality of delivery interval dimensions;
- determining a second linear regression function that estimates a number of requests per second as a second function of the test intervals applied to each of the plurality of delivery interval dimensions; and
- determining, for said each respective delivery interval dimension, the predetermined delivery interval that maximizes the first linear regression function subject to a threshold maximum allowable change in the second linear regression function.

3. The method of claim 2, wherein the threshold maximum allowable change in the second linear regression function comprises an increase of ten percent in the number of requests per second.

4. The method of claim 2, wherein the test intervals applied to each of the plurality of delivery interval dimensions are randomly initialized.

5. The method of claim 1, wherein selecting one of the full update and the partial update comprises:

- when the impression score is greater than a predetermined threshold, selecting the full update; and
- when the impression score is less than the predetermined threshold, selecting the partial update.

6. The method of claim 1, wherein training the classification model to predict whether the content will result in the impression comprises:

labeling each content update of a plurality of unique prior content updates as one of a positive sample and a negative sample;

wherein the positive sample denotes a first content update known to have resulted in the impression and the negative sample denotes a second content update that did not result in the impression.

7. The method of claim 6, wherein training the classification model to predict whether the content will result in the impression further comprises weighting said each content update of the plurality of unique prior content updates according to a respective interaction type.

8. The method of claim 6, wherein training the classification model to predict whether the content will result in the impression further comprises:

defining said each content update of the plurality of unique prior content updates according to a plurality of input features;

inputting, into the classification model, the plurality of input features for said each content update as a single respective input feature vector; and adjusting one or more internal weights of the classification model based on the input feature vectors.

9. The method of claim 8, wherein the plurality of input features comprise user-specific metadata including a content preference of the user, demographic information, a local time, a location of the user, and information for one or more prior impressions made by the user.

10. A system comprising: a memory comprising a non-transitory machine-readable storage medium that stores computer readable instructions, and one or more processors for executing the computer readable instructions, the computer readable instructions controlling the one or more processors to perform operations comprising:

determining a delivery interval for a content update provided to a user, wherein determining the delivery interval comprises:

defining a plurality of delivery interval dimensions, each respective delivery interval dimension of the plurality of delivery interval dimensions comprising a unique combination of one time cohort of two or more time cohorts and one user cohort of two or more user cohorts;

determining a time cohort of the two or more time cohorts and a user cohort of the two or more user cohorts for the user; and selecting a predetermined delivery interval of the delivery interval dimension matching the determined time cohort and the determined user cohort of the user as the delivery interval;

determining a delivery content for the content update provided to the user, wherein determining the delivery content comprises:

training a classification model to predict whether content will result in an impression;

inputting, into the classification model, the content update;

receiving, as output from the classification model, an impression score for the content update; and selecting one of a full update and a partial update as the delivery content from the impression score; and pushing the content update comprising the delivery content to a client device of the user at a frequency defined by the delivery interval.

11. The system of claim 10, further comprising locally caching the content update and rendering a preview frame from the cached content update;

wherein the computer readable instructions further control the one or more processors to receive, from the user, an impression of the preview frame.

12. The system of claim 11, wherein the computer readable instructions further control the one or more processors to, when the content update comprises the full update, render a flyout frame from the cached content update.

13. The system of claim 11, wherein the computer readable instructions further control the one or more processors to, when the content update comprises the partial update:

request an out-of-schedule content update comprising the full update from a proactive content delivery system;

receive, from the proactive content delivery system, the full update;

locally cache the full update; and render a flyout frame from the cached full update.

14. The system of claim 10, wherein a native application receiving the content update further receives an indicator identifying whether the full update or the partial update is included in the content update.

15. The system of claim 10, wherein a native application receiving the content update does not receive any indicators identifying whether the full update or the partial update is included in the content update.

16. A system comprising:

a proactive content delivery system comprising a memory having computer readable instructions and one or more processors for executing the computer readable instructions, the computer readable instructions controlling the one or more processors to perform operations comprising:

determining a delivery interval for a content update provided to a user, wherein determining the delivery interval comprises:

defining a plurality of delivery interval dimensions, each respective delivery interval dimension of the plurality of delivery interval dimensions comprising a unique combination of one time cohort of two or more time cohorts and one user cohort of two or more user cohorts;

determining a time cohort of the two or more time cohorts and a user cohort of the two or more user cohorts for the user; and selecting a predetermined delivery interval of the delivery interval dimension matching the determined time cohort and the determined user cohort of the user as the delivery interval;

determining a delivery content for the content update provided to the user, wherein determining the delivery content comprises:

training a classification model to predict whether content will result in an impression;

inputting, into the classification model, the content update;

receiving, as output from the classification model, an impression score for the content update; and selecting one of a full update and a partial update as the delivery content from the impression score; and pushing the content update comprising the delivery content to a client device of the user at a frequency defined by the delivery interval.

17. The system of claim 16, wherein the computer readable instructions control the one or more processors to perform further operations comprising:

determining a first linear regression function that estimates a number of daily active users as a first function of test intervals applied to each of the plurality of delivery interval dimensions;

determining a second linear regression function that estimates a number of requests per second as a second function of the test intervals applied to each of the plurality of delivery interval dimensions; and determining, for said each respective delivery interval dimension, the predetermined delivery interval that maximizes the first linear regression function subject to a threshold maximum allowable change in the second linear regression function.

18. The system of claim 17, wherein the threshold maximum allowable change in the second linear regression function comprises an increase of ten percent in the number of requests per second.

19. The system of claim 16, wherein selecting one of the full update and the partial update comprises:

when the impression score is greater than a predetermined threshold, selecting the full update; and when the impression score is less than the predetermined threshold, selecting the partial update.

20. The system of claim 16, wherein training the classification model to predict whether the content will result in the impression comprises:

labeling each content update of a plurality of unique prior content updates as one of a positive sample and a negative sample;

wherein the positive sample denotes a first content update known to have resulted in the impression and the negative sample denotes a second content update that did not result in the impression.

* * * * *